United States Patent
Andreoli et al.

(10) Patent No.: US 9,394,112 B2
(45) Date of Patent: Jul. 19, 2016

(54) CHAIN FOR CONVEYORS OF ARTICLES

(71) Applicant: Rexnord FlatTop Europe S.r.l., Correggio (IT)

(72) Inventors: Andrea Andreoli, Modena (IT); Guido Marchiani, Reggio Emilia (IT)

(73) Assignee: REXNORD FLATTOP EUROPE S.R.L., Correggio (IT)

( * ) Notice: Subject to any disclaimer, the term of this patent is extended or adjusted under 35 U.S.C. 154(b) by 0 days.

(21) Appl. No.: 14/694,731

(22) Filed: Apr. 23, 2015

(65) Prior Publication Data

US 2015/0307283 A1    Oct. 29, 2015

(30) Foreign Application Priority Data

Apr. 23, 2014    (IT) .............................. MI2014A0755

(51) Int. Cl.
| | |
|---|---|
| *B65G 17/38* | (2006.01) |
| *B65G 17/08* | (2006.01) |
| *B65G 17/06* | (2006.01) |
| *B65G 17/40* | (2006.01) |

(52) U.S. Cl.
CPC ............ *B65G 17/086* (2013.01); *B65G 17/066* (2013.01); *B65G 17/385* (2013.01); *B65G 17/40* (2013.01)

(58) Field of Classification Search
CPC ..... B65G 17/40; B65G 17/086; B65G 17/385
USPC ................................................. 198/852, 853
See application file for complete search history.

(56) References Cited

U.S. PATENT DOCUMENTS

| | | | | |
|---|---|---|---|---|
| 2,694,611 | A * | 11/1954 | Lorber ................. | A47B 96/025 108/102 |
| 4,524,865 | A * | 6/1985 | von Hofen .......... | B65G 17/086 198/852 |
| 5,027,944 | A * | 7/1991 | Damkjaer ............ | B65G 17/086 198/852 |
| 6,247,583 | B1 * | 6/2001 | Coen .................... | B65G 17/065 198/852 |
| 6,250,459 | B1 * | 6/2001 | Coen .................... | B65G 17/086 198/852 |
| 6,758,328 | B2 * | 7/2004 | Arai ..................... | B65G 17/086 198/844.1 |
| 7,044,290 | B2 * | 5/2006 | Garbagnati .......... | B65G 17/086 198/850 |
| 2005/0155848 | A1 * | 7/2005 | Garbagnati .......... | B65G 17/086 198/852 |

FOREIGN PATENT DOCUMENTS

| | | |
|---|---|---|
| DE | 102011117693 A1 | 5/2013 |
| EP | 2349877 A1 | 8/2011 |

OTHER PUBLICATIONS

European Patent Office, Extended European Search Report, Application No. 15164720.3 Aug. 28, 2015, 6 pages.

* cited by examiner

*Primary Examiner* — James R Bidwell
(74) *Attorney, Agent, or Firm* — Quarles & Brady LLP

(57) ABSTRACT

A transport chain for transporting articles includes a sequence of links. Each link defines a substantially flat support surface for the articles to be transported, and wherein each link is hingedly coupled with a previous link in the sequence. Each link includes a respective first link element defining a first portion of the support surface of the link and a respective second link element defining a second portion of the support surface of the link. The first link element and the second link element are hingedly coupled with each other through mechanical coupling allowing the first link element to rotate with respect to the second link element, and vice versa, about a rotation axis perpendicular to the support surface of the link. The mechanical coupling is spaced from the rotation axis.

13 Claims, 9 Drawing Sheets

CHAIN FOR CONVEYORS OF ARTICLES

CROSS-REFERENCE TO RELATED APPLICATIONS

This application claims the benefit of Italian Patent Application MI2014A000755 filed Apr. 23, 2014, which is hereby incorporated herein by reference for all purposes.

STATEMENT REGARDING FEDERALLY SPONSORED RESEARCH OR DEVELOPMENT

Not applicable.

FIELD OF THE INVENTION

The present invention generally relates to the field of conveyors of articles, particularly to the field of slat chain conveyors, and more specifically the invention relates to a transport chain for transporting articles of the type comprising a plurality of links, in which each link defines a support surface for the articles to be transported.

BACKGROUND OF THE INVENTION

As it is known, transport chains of the type specified above have to satisfy the need to carry out paths which are not only straight but that also include more or less pronounced curves.

Many of the transport chains currently used have the disadvantage that, when in a curve, and in particular at the extrados, open spaces are formed between adjacent links, which spaces not only interrupt the continuity of the support surface, but may also cause failures or accidents, when at the end of the curve such spaces should close onto a foreign object, a transported article, or on a finger of an operator, which have meanwhile occupied these open spaces.

The presence of such open spaces can also cause falling of the transported articles from the transport chain when the articles undergo accelerations or decelerations to adapt their speed to that of the chain. This can happen for example when the items are transferred from a transport chain that is moving at a first speed to a transport chain that is moving at a second speed different from the first.

For this reason transport chains have been proposed that comprise links carrying plates having an arched profile, which plates are able to engage in corresponding arched seats on the links themselves. In this way, when in a curve, no open space is formed, since the arcuate plate of each link is capable of articulating in the corresponding arcuate seat.

An example of a transport chain of this type, also called in jargon "zero-gap", is shown in European patent application EP 926082. In particular, each link of the transport chain includes a support surface having an arcuate seat and a pin having a plate-like head with an arcuate profile: the plate-like head is at the same level of the support surface and extends along the link up to engage the corresponding curved seat.

However, such a transport chain, while being able to avoid the formation of open spaces in the support surface when in a curve, does not appear to be advantageous in other respects. In fact, in a transport chain of this type, the longitudinal dimensions—that is, along the sliding direction of the chain—of each link must be necessarily high, as the support surface of each link must be large enough for housing the plate-like head of the corresponding pin. Since the longitudinal dimensions of the links are closely related to the minimum pitch obtainable between adjacent links of the transport chain, a transport chain of the type described in European patent application EP 926082 has a relatively large pitch.

A transport chain similar to the above is also described in European patent EP 910540.

Another example of a zero-gap transport chain is provided in European patent application EP 1375391, in which the pin associated with a link of the chain is connected to a plate-like portion having an arcuate profile provided with a rear extension adapted to act as a support surface connecting the plate-like portion itself and the support surface provided by the previous link.

A still further example of the zero-gap transport chain is shown in European Patent EP 2349877.

The fact of not being able to have a reduced pitch is a drawback of the transport chain in all those applications. In particular, the minimum radius of curvature of the path the links of the chain are able to travel is determined by the pitch between the links themselves. If the pitch between the links is relatively high, the transport chain will only be possible with curves having a relatively large radius of curvature.

Accordingly, the problem that underlies the present invention is to devise a transport chain capable of offering as support surface which does not exhibit open spaces between the links when in a curve, and at the same time exhibits structural and functional features to alleviate said drawback of the zero-gap transport chains known in the state of the art.

SUMMARY OF THE INVENTION

The aspects of the solution to the problem in accordance with an embodiment of the present invention are indicated in the independent claim.

In particular, one aspect of the present invention relates to a transport chain for transporting articles. The transport chain comprises a sequence of links. Each link defines a substantially flat support surface for the articles to be transported. Each link is connected in an articulated manner with a previous link in the sequence. Each link includes a respective first link element defining a first portion of the support surface of the link and a corresponding second link element defining a second portion of the support surface of the link. Said first link element and said second link element are coupled to each other in an articulated manner by means of a mechanical coupling which allow the first link element to rotate with respect to the second link element and vice versa, about an axis of rotation perpendicular to the support surface of the link. Said mechanical coupling is spaced from the axis of rotation.

This specific manner in which the first link element and the second link element are coupled to each other through sliding the mechanical coupling, the position of which does not correspond to the center of rotation of the first link element with respect to the second link element (and vice versa), renders it possible to rotate the first link element with respect to the second link element (and vice versa) about an axis of rotation without the need for each link to extend up to the axis of rotation. This allows for a relatively small pitch between adjacent links in the chain as compared to the known solutions.

In this way it is possible to build a transport chain having a relatively high width/pitch ratio. For example, with the proposed solution it is possible to build transport chains with width/pitch ratios having values even higher than about 2.8.

In a particular embodiment of the transport chain according to the present invention said mechanical coupling between the first link element and the second link element of a link are configured in such a way that said rotation axis does not intersect said link. Thus, the axis of rotation of the first link element with respect to the second link element of the link falls outside the longitudinal extension, i.e. in the advancement direction of the chain, of the link.

In a further particular embodiment of the transport chain according to the invention said mechanical coupling comprises a pivot at one of the first link element and the second link element, and an eyelet at the other of the first link element and the second link element, said pivot being slidingly engaged in said eyelet. The first link element and the second link element of a link may thus be coupled to each other in an articulated manner.

In a preferred embodiment of the transport chain according to the invention the pivot comprises a roller slidingly housed in the eyelet, said roller moving within the eyelet by rolling against the walls of the eyelet. By providing the pivot as a roller a normal sliding friction between the pivot and eyelet is replaced by a rolling friction between the roller and the eyelet, resulting in less wear and extending the operating life of the transport chain.

A further particular embodiment of the transport chain according to the invention is characterized in that said first link element comprises a fork element, said pivot being supported between two arms of the fork element, and said second link element comprises an engaging member comprising said eyelet, said engaging member being arranged for being inserted between the two arms of the fork element.

In a further preferred embodiment of the transport chain according to the invention said pivot is integrally fastened to the fork element.

In a further particular embodiment of the transport chain according to the invention said mechanical coupling comprises a pin at one of the first link element and the second link element, an engaging member at the other of the first link element and the second link element, the engaging member comprising a slot, and the pin being slidingly engaged in the slot of the engaging member.

A further particular embodiment of the transport chain according to the invention is characterized in that said mechanical coupling comprises a first eyelet at one of the first link element and second link element, a second eyelet and a third eyelet at the other of the first link element and second link element, said first eyelet being arranged between said second eyelet and said third eyelet in such a way to at least partially overlap therewith, and a roller slidingly housed in the first eyelet, in the second eyelet and in the third eyelet, said roller being free for slidingly moving within the first eyelet, the second eyelet and the third eyelet by rolling against the walls of said first eyelet, second eyelet, and third eyelet. The overlapping eyelets allow for a roller to be slidingly housed therein which roller remains free to move with respect to both the first link element and the second link element. It is therefore possible to obtain a desired maximum angle of rotation between the first link element and second element without having to provide an excessively long slot or eyelet.

Other advantageous embodiments of the transport chain according to the invention are described in the dependent claims.

Another aspect of the present invention relates to a link for use in a transport chain according to the invention.

The solution in accordance with one or more embodiments of the invention, as well as additional features and advantages thereof, will be best understood by reference to the following detailed description, given merely by way of non-limiting example, to be read in conjunction with the accompanying figures. In this respect, it is expressly understood that the figures are not necessarily in scale and that, unless otherwise indicated, they are merely intended to conceptually illustrate the structures and procedures described.

BRIEF DESCRIPTION OF THE DRAWINGS

In particular.

DETAILED DESCRIPTION OF THE EXAMPLE EMBODIMENTS

Figure 1A:
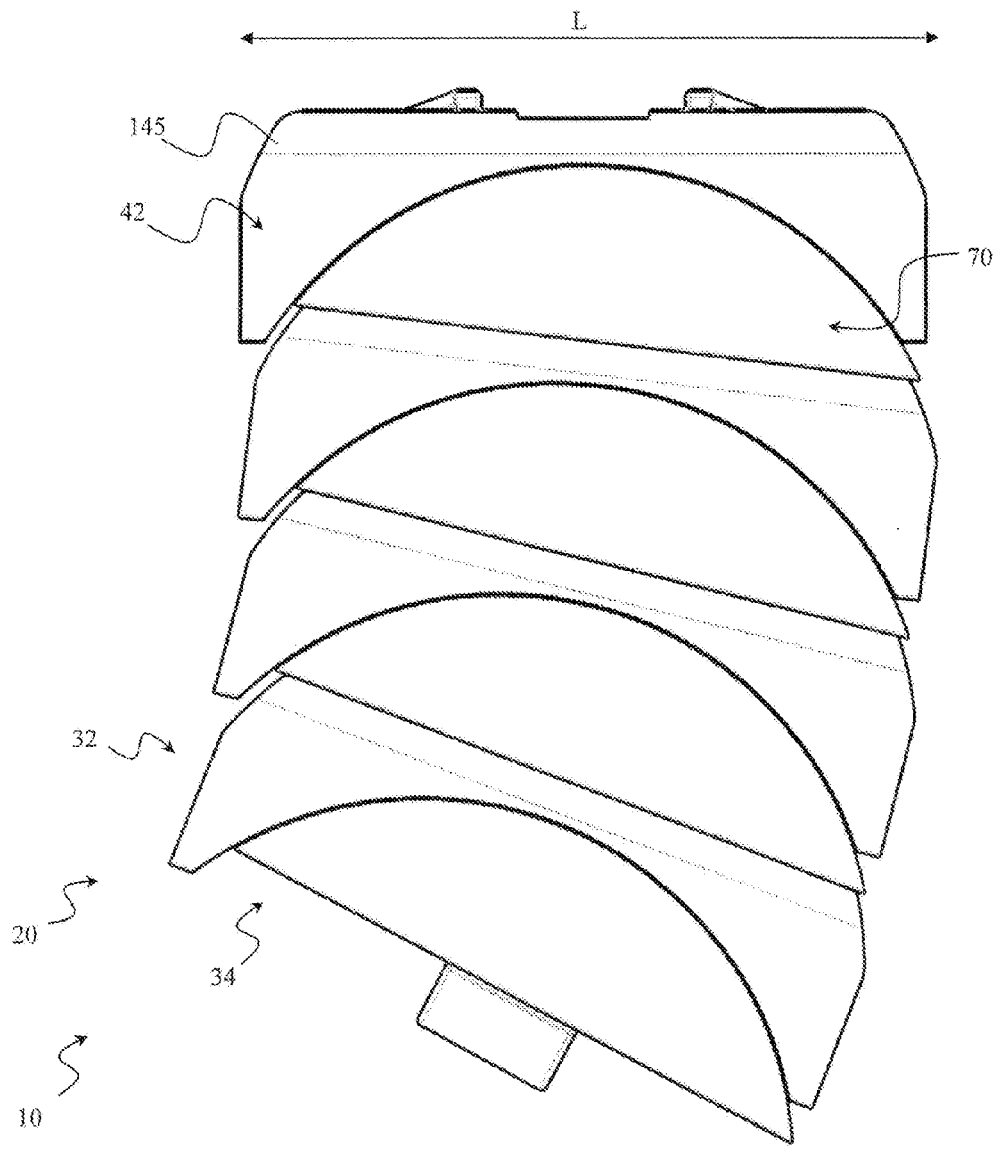
FIG. 1A and FIG. 1B are a view from above and from below, respectively, of a transport chain for the transport of articles in accordance with an embodiment of the present invention.
Figure 1B:
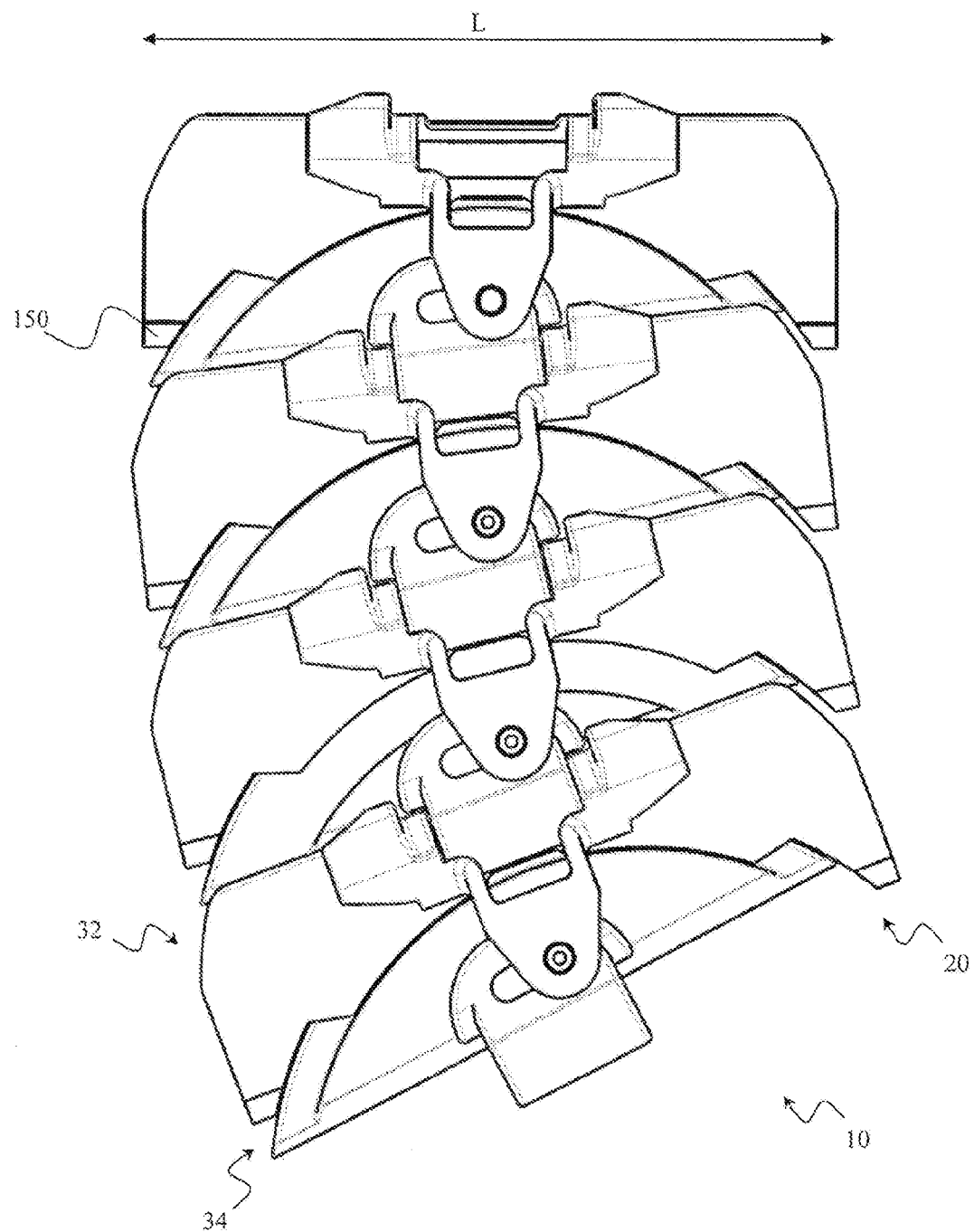

With reference to the figures, FIG. 1A is a top view of a transport chain for transporting articles, globally indicated with reference numeral 10, in accordance with an embodiment of the present invention. FIG. 1B represents a view of the same transport chain 10 but from below.

The transport chain 10 has a width L and includes a plurality of links 20 coupled to each other in an articulated manner. Each link 20 is adapted to define a corresponding substantially flat support surface for the transport of articles. As will be described in greater detail below, each link 20 in turn comprises a respective first link element 32 connected in an articulated manner to a respective second link element 34. The first link element 32 and the second link element 34 are adapted to define respective first and second portions, respectively, of the supporting surface corresponding to the link 20 to which they belong.

Figure 2A:
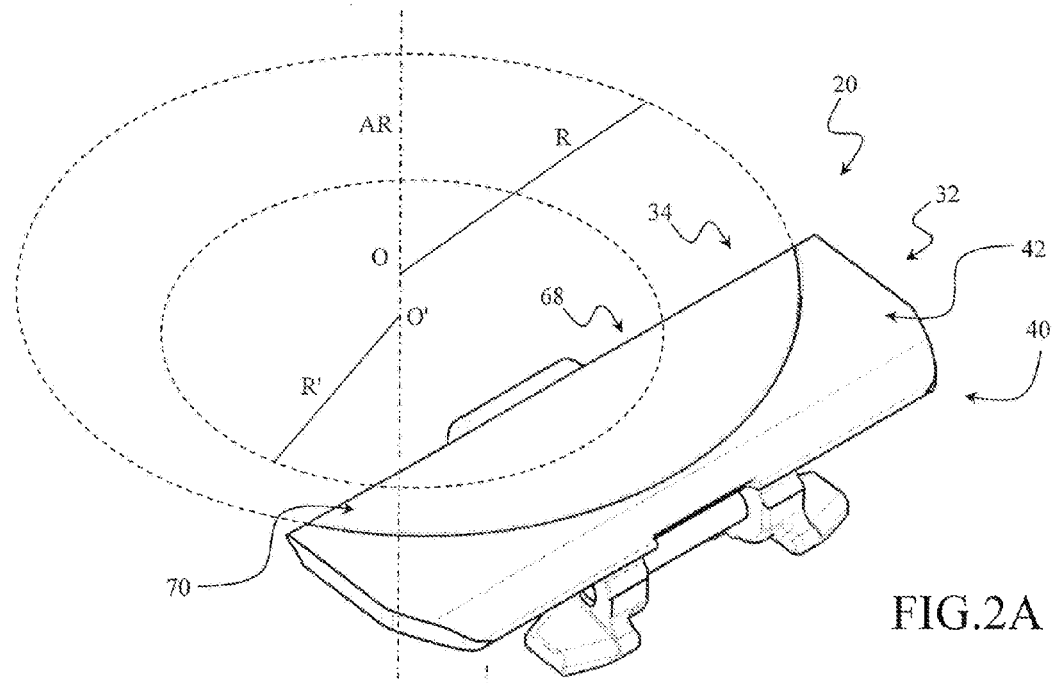
FIG. 2A is a perspective view from above of a link of the transport chain of FIGS. 1A and 1B.
Figure 2B:
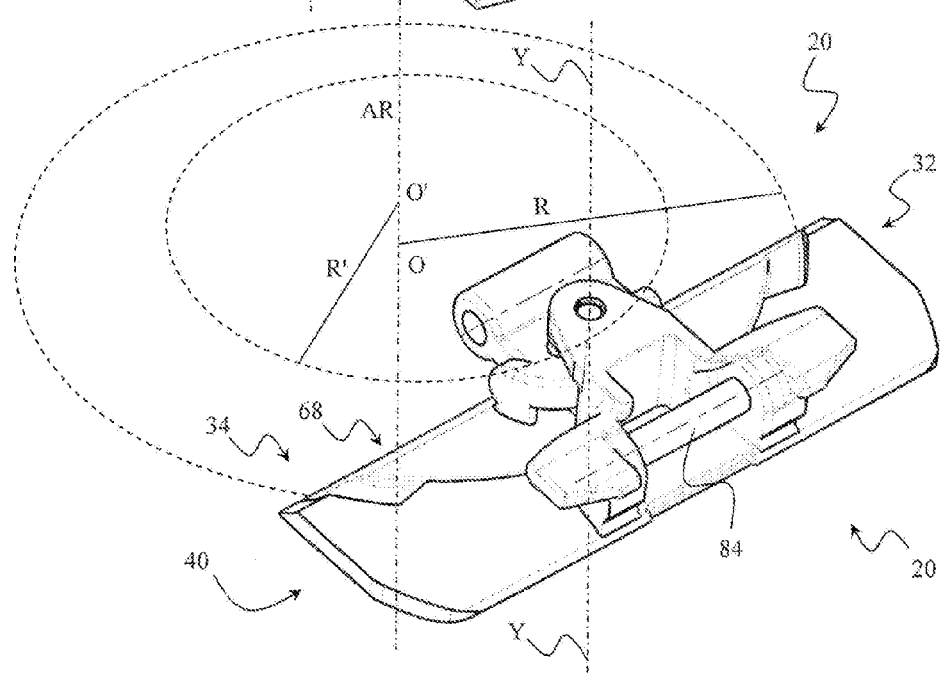
FIG. 2B is a perspective view from below of a link of the transport chain of FIGS. 1A and 1B.
Figure 3A:
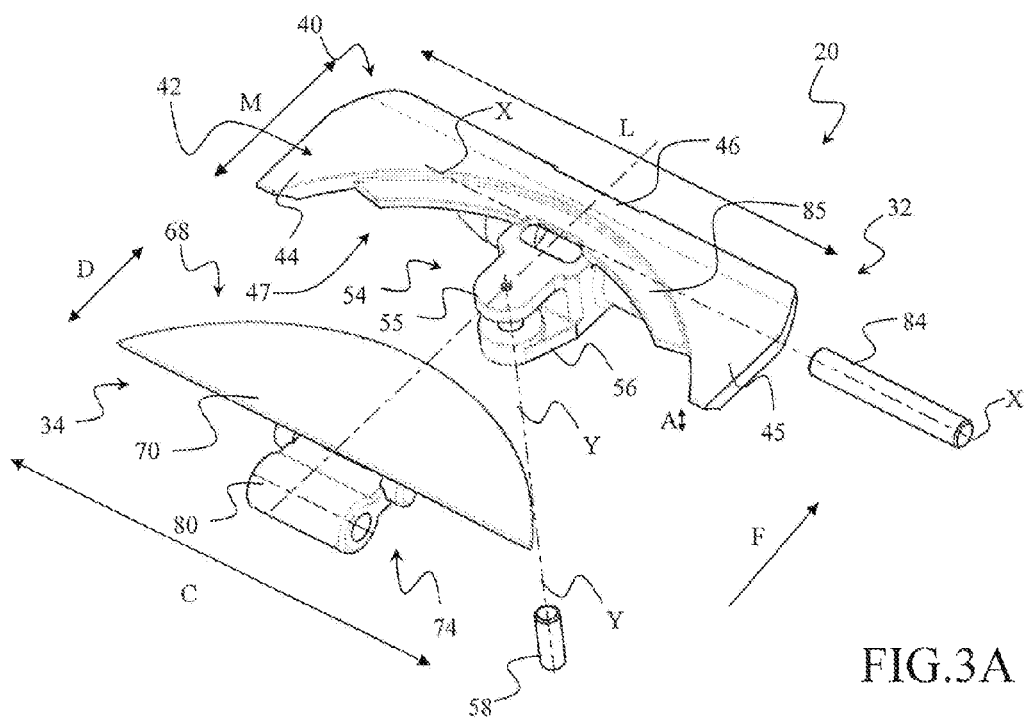
FIG. 3A is an exploded view of the link of FIG. 2A.
Figure 3B:
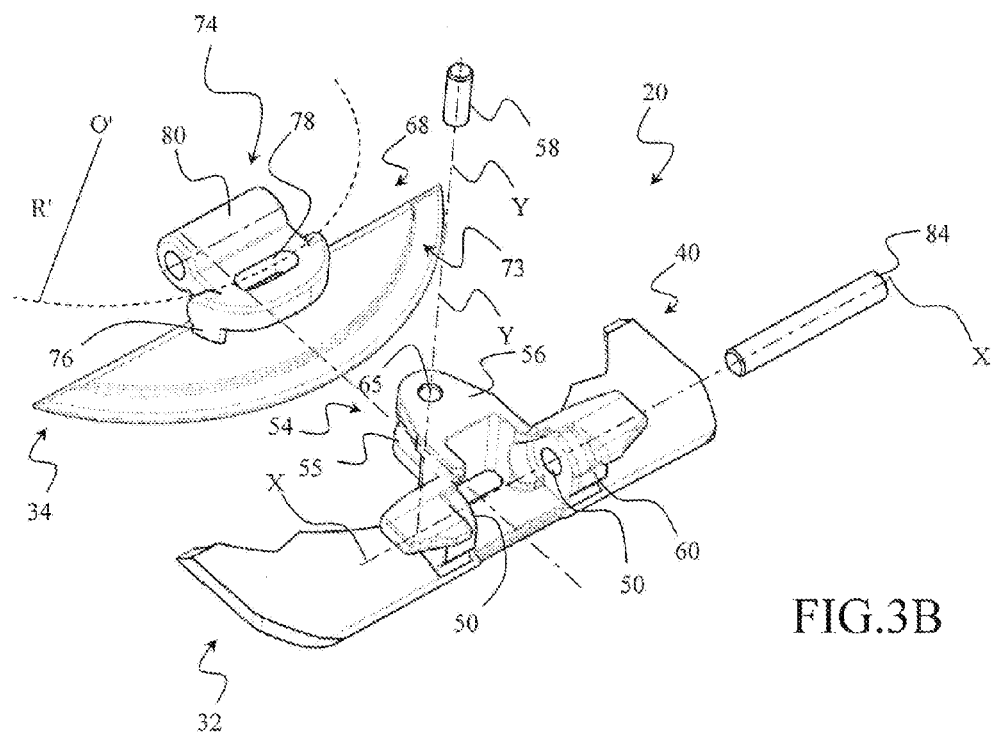
FIG. 3B is an exploded view of the link of FIG. 2B.

FIG. 2A is a perspective view from above and FIG. 2B is a perspective view from below of a link 20 of the chain 10 of FIGS. 1A, 1B. FIG. 3A is an exploded view of the link of FIG. 2A, and FIG. 3B is an exploded view of the link of FIG. 2B.

The first link element 32 includes a first plate-like portion 40 of predetermined thickness, indicated in the figure with A, having a width L and a length M. The first plate-like portion 40 has an upper support surface 42 (corresponding to the first portion of the support surface of the link 20) for the articles to be transported.

In accordance with an embodiment of the present invention, the support surface 42 is formed by two support sub-portions 44, 45, coupled together by means of a connecting element 46, for example a thin bridge, in particular, the first plate-like portion 40 is shaped so as to include a seat 47 having an arcuate shape that extends for the whole width L and for the entire length M, so that each supporting sub-portion 44, 45 has a shape similar to that of a right triangle, with a first leg having a length M, a second leg having a length equal to approximately half the width L and a curved hypotenuse defined by the arcuate seat 47.

The first link element 32 exhibits at the opposite ends thereof along the direction of the transport chain 10, indicated in the figure with F: —on one side, two lateral eyes 50 connected to form a fork and facing one another along the axis XX perpendicular to the direction F and parallel to the support surface 42, and —on the other side, a fork element 54, adapted to support between an upper arm 55 and a lower arm 56 a metal pin 58 having an axis YY perpendicular to the axis XX and to the support surface 42.

The lateral eyes 50 are provided with hollow cylindrical appendixes 60, while the lower arm 56 of the fork element 54 is provided with a hole 65 for housing the pin 58 in the fork element 54.

The second link element 34 comprises a second plate-like portion 68 which comprises an upper support surface 70 (corresponding to the second portion of the support surface of the link 20) for the articles to be transported. The second plate-like portion 68 has the shape of a segment of a circle, having a radius R and a center O (see FIGS. 2A and 2B). The second plate-like is lower than the radius R. The second plate-like portion 68 preferably but not necessarily has a thickness substantially equal to the thickness A of the first plate portion 40. As is visible in FIG. 3B, the second plate-like portion 68 also includes an arcuate slot 73 positioned in a peripheral portion—next to the arcuate edge of the second plate portion 68.

The second link element 34 comprises an engaging member 74 connected to the surface of the second plate-like portion 68 opposite to the support surface 70 by means of spacer elements 76 configured so as to leave a space between the engaging member 74 and the second plate-like portion 68 at least equal to the thickness (along a direction parallel to the axis YY) of the upper arm 55 of the fork element 54 of the first link element 32.

In accordance with an embodiment of the present invention, the engaging member 74 comprises an eyelet 78 which extends along a plane parallel to the support surface 70 and is adapted to slidingly receive the pin 58 supported by the fork element 54 of the first link element 32 of the link when the engaging member 74 is inserted between the arms 55, 56 of the fork element 54. The diameter of the pin 58 is lower than the width of the eyelet 78 along the direction perpendicular to the sliding direction of the pin 58 within the eyelet 78 itself.

The second link element 34 also includes a hub 80 which extends along a direction parallel to the axis XX. The hub 80 is connected to one end of the engaging member 74 so as to protrude from the base of the second plate portion 68 so as not to be covered by the support surface 70. The hub 80 is adapted to be inserted into the space between the two lateral eyes 50 of the first link element 32 corresponding to the previous link 20 in the transport chain 10. By placing the hub 80 of the second link element 34 of a link 20 between the two lateral eyes 50 of the first link element 32 of the link which precedes such a link in the chain conveyor 10, coaxially aligning said hub 80 to such lateral eyes 50 along the axis XX, and by inserting a metal pin 84 within said hub 80 and such lateral eyes 50 the two links 20 are coupled together in an articulated manner. In this way, the two adjacent links 20 are able to relatively rotate to one another about the axis XX.

In accordance with an embodiment of the present invention, the first link element 32 and the second link element 34 of a same link 20 are coupled to each other in an articulated manner by means of the pin 58 supported by the fork element 54 of the first link element 32, being slidingly engaged within the eyelet 78 of the engaging member 74 of the second link element 32.

The seat 47 having an arcuate shape of the first plate-like portion 40 has the shape of a segment of a circle, having a radius equal to R and a center substantially coincident with the center O (see FIGS. 2A-2B); furthermore, the seat 47 comprises an arcuate lip support element 85, having a thickness lower than the thickness A of the first plate portion 40, and adapted to cooperate with the second plate-like portion 68 to be received in the arcuate slot 73 of the latter.

In accordance with an embodiment of the present invention, the eyelet 78 of the engaging member 74 of the second link element 32 has an arcuate profile, which describes an arc of circumference having a center O' aligned to the center O along a direction which is parallel to the axis YY, and a radius R' lower than the radius R (see FIGS. 2A and 2B). The second link element 34 is housed in the seat 47 of the first plate portion 40 of the first link element 32, and thanks to the coupling between the mechanical sliding pin 58 and slot 78, is free to rotate, with respect to the first link element 32, about an axis of rotation AR passing through the centers O and O' and parallel to the axis YY. In order to allow the second link element 34 to rotate relatively to the first link element 32 (and vice versa), the arcuate slot 73 of the second plate-like portion 68 has an extension that is greater than the lip support element 85. The maximum angle of rotation which the first link element 32 may span with respect to the second link element 34 (and vice versa) during the rotation about the axis of rotation AR is determined by the stroke of the pin 58 within the eyelet 78, i.e., by the length of the arc of circumference spanned by the slot 78.

Accordingly, while two adjacent links 20 of the transport chain 10 are coupled to each other in rotary manner by means of the pin 84 coaxially inserted in the eyes 50 of a link and into the hub 80 the other link, the first link element 32 and the second link element 34 of a same link 20 are coupled in a rotating manner by means of the pin 58 supported by the fork element 54 of the first link element 32, being slidingly engaged within the slot 78 of the engaging member 74 of the second link element 32. When the pin 58 is engaged in the slot 78, the support surface 42 of the first plate-like portion 40 is at the same level of the supporting surface 70 of the second plate-like portion 68, and both contribute to form the substantially flat support surface for the transport of articles defined by the link 20. Therefore, in the transport chain 10, on the support surface for the articles to be transported there alternatingly ensue the supporting surfaces 42 of the first plate-shaped portions 40 and the support surfaces 70 of the second plate-shaped portions 68, which are coplanar to each other.

In accordance with an embodiment of the present invention, in each link 20 of the transport chain 10, the articulation between the first link element 32 and the second link element 34 is ensured by means of sliding the mechanical coupling, realized by means of the pin 58—eyelet 78 assembly, which allow the first link element 32 to rotate with respect to the second link element 34 (and vice versa) about an axis of rotation AR (perpendicular to the support surface of the link 20 that is spaced from the sliding mechanical coupling themselves.

In other words, in the solution in accordance with an embodiment of the present invention, the first link element 32 link and the second link element 34 are coupled by means of sliding the mechanical coupling the position of which does not correspond to the axis of rotation AR of the first link element 32 with respect to the second link element 34 (and vice versa).

In particular, in the embodiment illustrated in FIGS. 1A, 1B, 2A, 2B, 3A, 3B, in each link 20, the axis of rotation AR of the first link element 32 with respect to the second link element 34 (and vice versa) of said link 20 falls outside the longitudinal extension (along the advancement direction F of the transport chain 10) of the link 20 itself. In other words, in the embodiment illustrated in FIGS. 1A, 1B, 2A, 2B, 3A, 3B, in each link 20, the axis of rotation AR of the first link element 32 with respect to the second link element 34 (and vice versa) of such a link does not intersect the link 20 itself.

In operation, the support surface of the transport chain 10 maintains substantially intact in its continuity. In fact, the first link element 32 of each link 20 rotates with respect to the second link element 34 of the same link 20 about a respective axis of rotation AR without resulting in the opening of unwanted spaces.

Furthermore, the support surface of the transport chain 10 keeps substantially intact in its continuity even when small articulations between adjacent links 20 occur, namely in the case in which a link 20 rotates with respect to the adjacent link 20 about the axis XX which is coaxial to the pin 84 that hinges them by a relatively reduced angle. In particular, according to an embodiment of the present invention, the connecting element 46, which connects the supporting, sub-portions 44, 45 of the plate-like portion 40, has a rounded profile 145, and the base of the second plate-like portion 68 has a corresponding rounded profile 150. The rounded profile 145 of the first plate-like portion 40 of a link 20 interacts with the rounded profile 150 of the second plate portion 68 corresponding to the adjacent link 20, allowing the two links 20 to rotate about the pin 84 that hinges them by an angle (relatively reduced) that can be either positive or negative, i.e., allowing both ventral joints, as in the winding on the motor pinion, and ridge joints, as in correspondence of chain tensioners.

The pitch that can be obtained between adjacent links 20 in the chain, for example defined as the distance between the axes (XX) of the pins 84 of adjacent links 20, appears to be very reduced as compared to the known solutions. This advantageous feature results from the peculiar manner in which the first link element 32 and the second link element 34 are coupled to each other, i.e., through sliding the mechanical coupling, the position of which does not correspond to the center of rotation O' of the first link element 32 with respect to the second link element 34 (and vice versa). In this way, in each link 20 it is possible to rotate the first link element 3 with respect to the second link element 34 (and vice versa) about an axis of rotation AR without having to provide that the whole extension of such link 20 along the advancement direction F the transport chain 10 (corresponding to the length M) is sufficiently long as to intersect the axis of rotation AR.

In this way it is possible to build a transport chain 10 having a relatively high width/pitch ratio, solving the problems mentioned in the introduction of this document. For example, with the proposed solution it is possible to build transport chains with width/pitch ratios having values even higher than about 2.8.

Figure 4A:
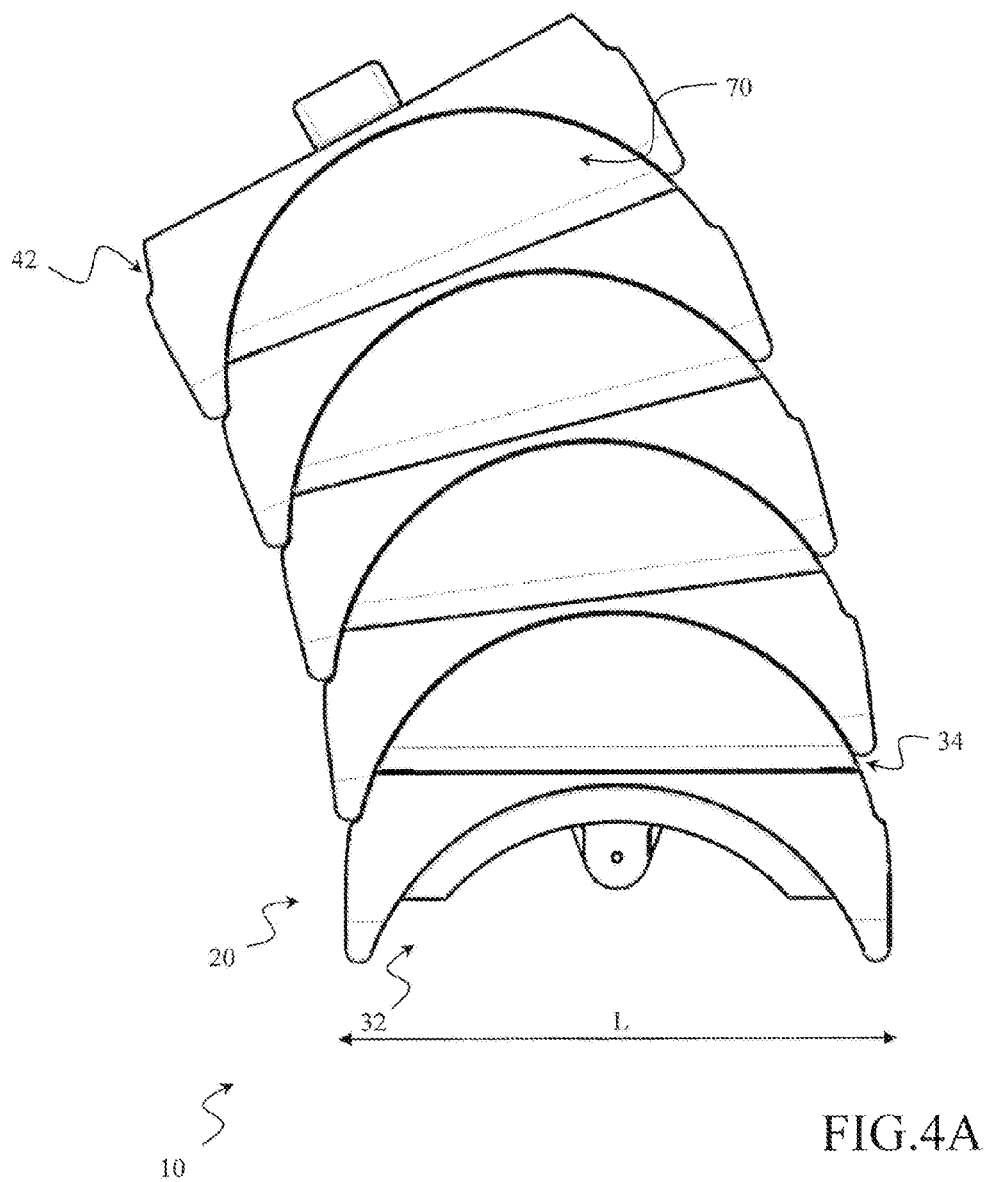
FIG. 4A and FIG. 4B are views from above and below, respectively, of a transport chain for the transport of articles in accordance with a further embodiment of the present invention.
Figure 4B:
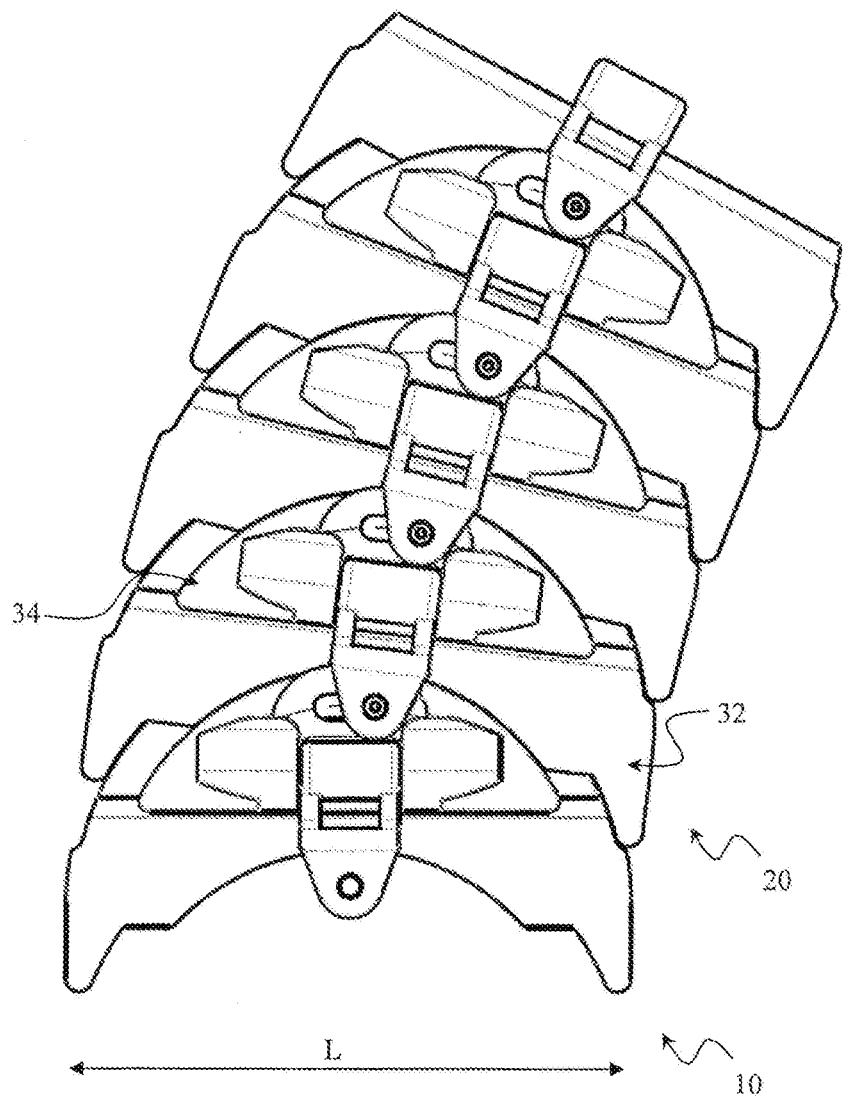
Figure 5:
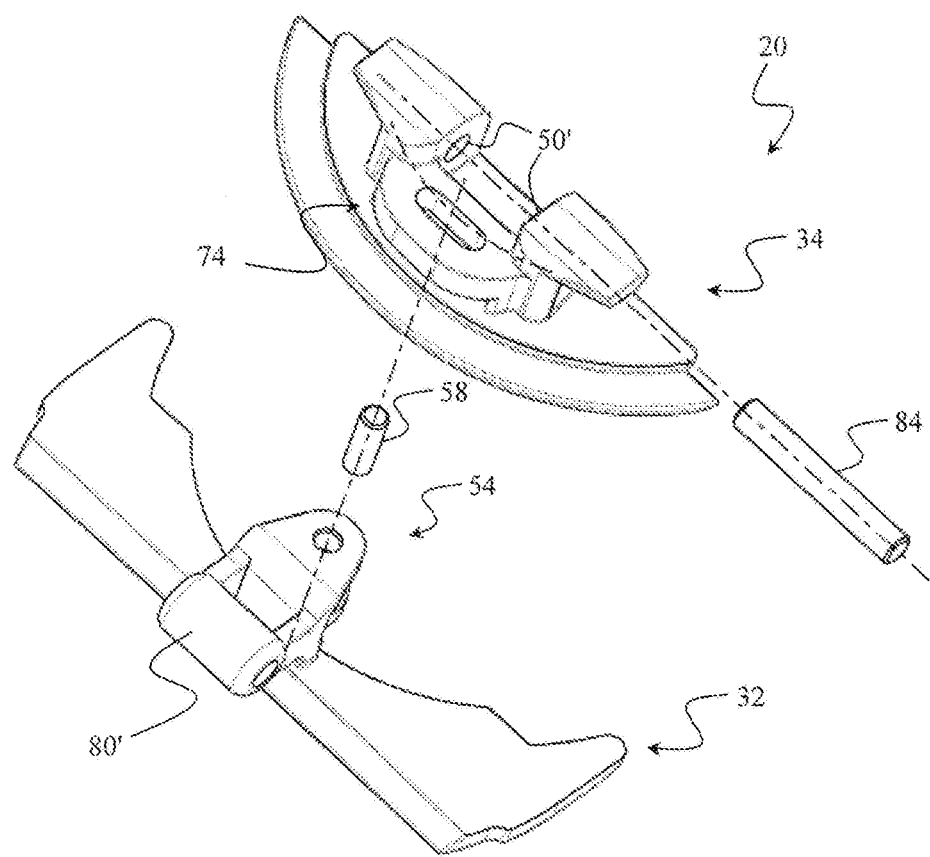
FIG. 5 is an exploded view of a link of the transport chain of FIGS. 4A and 4B.

In accordance with another embodiment of the present invention illustrated in FIGS. 4A, 4B and 5, the position of the lateral eyes and of the hub adapted to coaxially house therein the pin 84 for the articulated coupling between two adjacent links 20 is inverted, with the lateral eyes—identified with the reference 50'—located in the second link element 34 and the hub—identified with the reference 80'—located in the first element of the link 32. For example, in the embodiment illustrated in FIGS. 4A, 4B and 5, the lateral eyes 50 are connected to one end of the engaging member 74 of the second link element 34, while the hub 80' is connected to the fork element 54 of the first link element 32.

In the embodiments described up to now, the sliding mechanical coupling which allow the first link element 32 to rotate with respect to the second link element 34 (and vice versa) comprise a pin 58 and a eyelet 78 adapted to slidingly accommodate the pin 58, where the latter is inserted by interference between the upper arm 55 and lower arm 56 of the fork element 54 through the hole 65. In this way, the pin 58 is integrally bound with the fork element 54, and therefore to the first link element 32.

Figure 6:
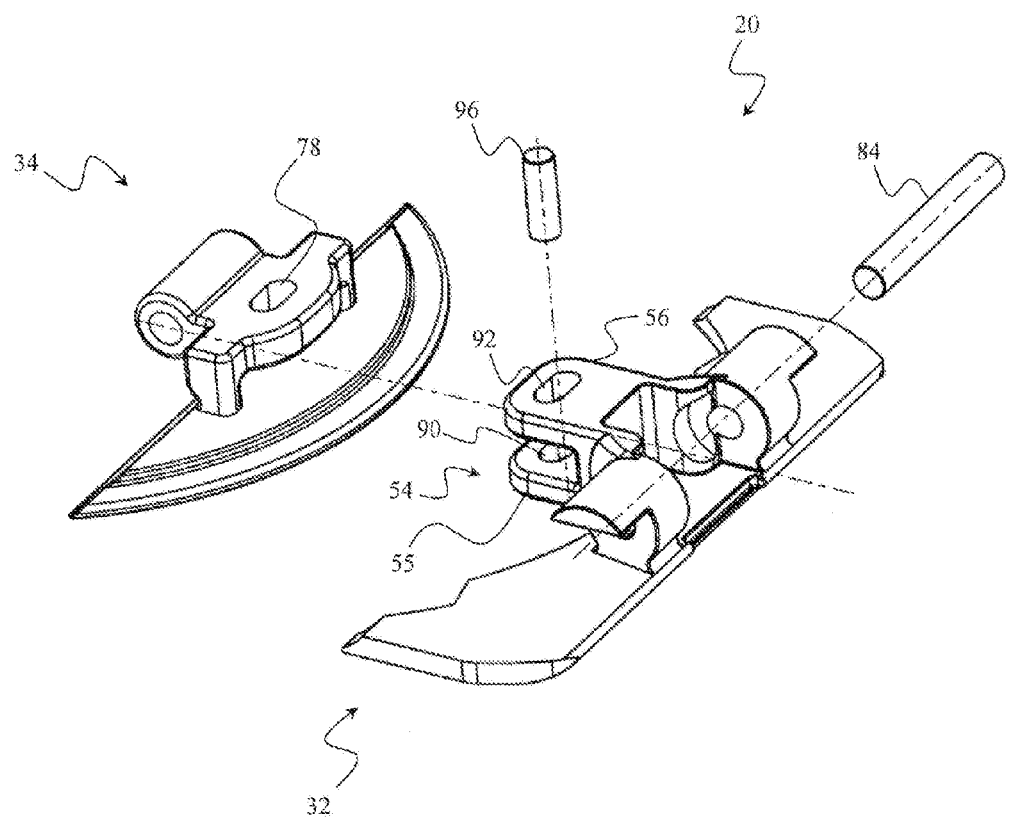
FIG. 6 is an exploded view of a link of the transport chain in accordance with a further embodiment of the present invention.

In accordance with a further embodiment of the present invention illustrated in FIG. 6, the upper arm 55 and lower arm 56 of the fork element 54 are provided with corresponding respective eyelets 90, 92 arranged so as to at least partially overlap to the eyelet 78 when the engaging member 74 is inserted between the arms 55, 56, so as to allow a roller 96 (for example, a metal roller) to be inserted in all the three overlapping eyelets 78, 90, 92, in accordance with this embodiment, the roller 96 is no longer integrally bound with the fork element 54 as the pin 58, since it is slidingly housed in all the three overlapping eyelets 78, 90, 92—with the eyelet 78 which can rotate with respect to the eyelets 90, 92 (and vice versa)—, and it is therefore free to move both with respect to the first link element 32 and with the second link element 34. The diameter of the roller 96 corresponds approximately to the width of the eyelets 78, 90, 92 along the direction perpendicular to the sliding direction of the roller 96 within the eyelets 78, 90, 92 themselves. Similar considerations may apply in the case here the fork element provided with arms provided with eyelets is located on the second link element, and the engaging member provided with a single eyelet is located on the first link element.

This solution is particularly advantageous for two reasons.

First of all, it is possible to obtain a desired maximum angle of rotation without having to provide excessively long eyelets, without weakening the structure of the link elements 32, 34. For example, in order to obtain an angle of articulation between the first fink element 32 and the second link element 34 equal to 30°, instead of using a single eyelet which describes an arc of 30°, it is possible to use an eyelet that describes an arc of 15° on a link element (for example, the second link element 34) and a pair of eyelets that each describe an arc of 15° on the other link element or example the first link element 32).

Moreover, unlike the previous cases, in which the pin 58 is firmly bound to the fork element 54 of the first link element 32, and therefore such pin 58 is adapted to move within the eyelet 78 slithering against the walls of the latter, in the embodiment illustrated in FIG. 6 the roller 96, not being firmly bound to any element, slides within the eyelets 78, 90 and 92 rolling against the walls of the latter. Consequently, in accordance with this embodiment, the sliding friction between the roller and eyelet is replaced with a rolling friction which wears less the elements which are in contact, extending the operating life of the transport chain 10.

The eyelet 78 and the eyelets 90, 92 each describe a respective arc of a circle having a center belonging to the axis of rotation AR. In the embodiment illustrated in FIG. 6, the eyelet 78 and the eyelets 90, 92 preferably each describe an arc of a circle having a same radius R' and a same length. However, the concepts of the present invention also apply in cases with eyelets having different lengths and/or describing arcs of circles with different radii. In any case, the more the radiuses corresponding to the various eyelets are similar between them, the lower the possibility of causing unwanted openings to form on the support surface of the transport chain 10. The concepts of the present invention described in relation to the embodiments described up to now apply also in the case where one or more of the eyelets does not exactly describe an arc of circle.

In the exemplary embodiments described so far, the first plate-like portion 40, the lateral eyes 50, and the fork element of the first link element 34 together constitute a monolithic piece, preferably obtained by injection molding of a plastic material. Similarly, the second plate-like portion 68, the engaging member 74 and the hub 80 of the second link element 34 together constitute a further monolithic piece, preferably obtained by injection molding of a plastic material.

However, similar considerations apply in case (at least some of) these elements are made as separate parts which can be mechanically coupled, even made of different materials, and then mounted and fixed together to form the first link element 32 and the second link element 34. For example, in the embodiment illustrated in FIG. 7, the first link element 32 and the second link element 34 each comprises two main sections which can be mechanically coupled together.

The first link element 32 comprises a first section 102, for example made of plastic material, comprising the first plate-like portion 40 and the lateral eyes 50, and a second section 104, for example made of metallic material, comprising the fork element 54 and an additional pair of eyes 106. The first section 102 and second section 104 are configured to be coupled to each other—with the eyes 106 inserted in the space between the lateral eyes 50, coaxially to the latter—for example by means of a snap fit mounting or dowel to form the first link element 32.

In a similar manner, the second link element 34 comprises a first section 108, for example made of plastic material, comprising the second plate-like portion 68, and a second section 110, for example made of metallic material, comprising the engaging member 74 and the hub 80. The first section 108 and second section 110 are configured to be coupled together, for example by a snap fit mounting or dowel to form the second link element 34.

Figure 7:
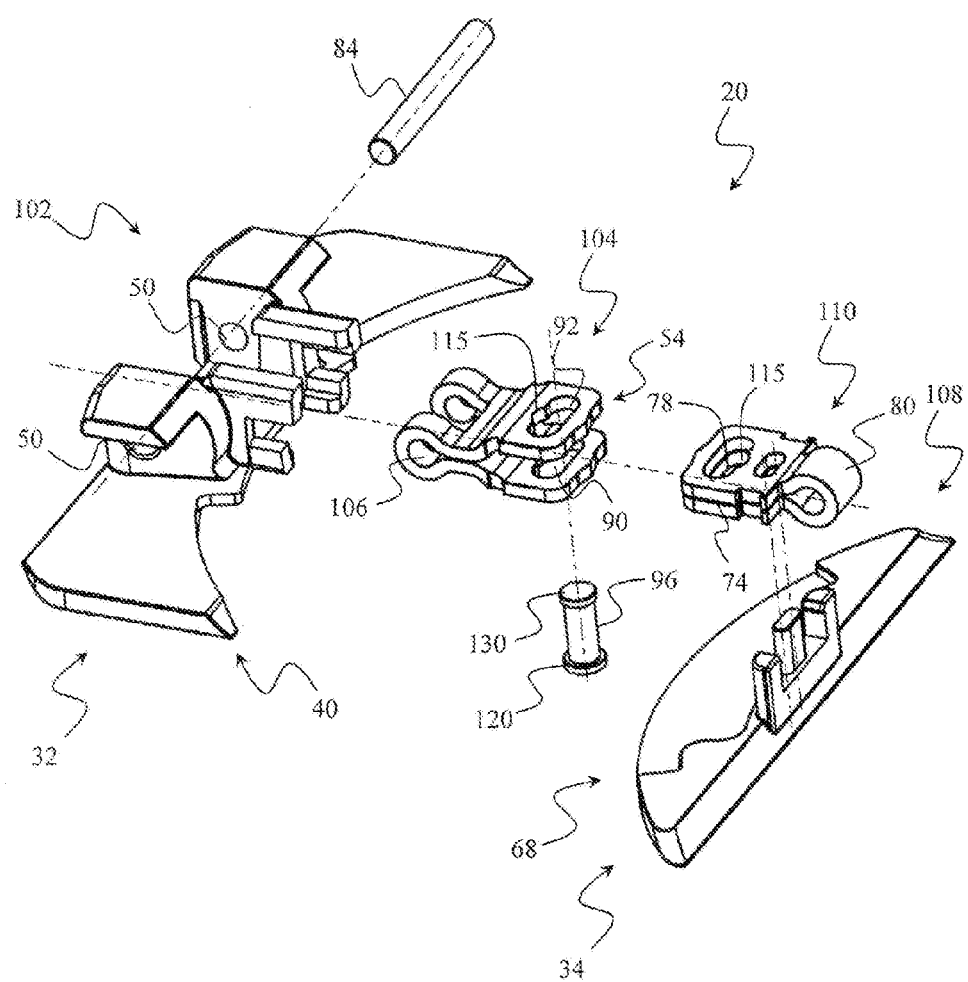
FIG. 7 is an exploded view of a link of the transport chain in accordance with a still further embodiment of the present invention.

In the exemplary embodiment illustrated in FIG. 7, the fork element 54 of the second section 104 of the first link element 32 is provided with two eyelets 90, 92, as in the embodiment of FIG. 6. Similar considerations may apply in the case in which the fork element provided with arms provided with eyelets is located in a section of the second link element, and the engaging member provided with a single eyelet is located in a section of the first link element. Similarly, also the links of the chain according to the embodiments described in the preceding figures in which there is only one eyelet adapted to slidingly house a pin which is integrally bound with the fork element, can have the first link element and the second link element which comprise each two main sections that can be mechanically coupled together, also made of different materials.

In the exemplary embodiment illustrated in FIG. 7 (but similar considerations may also apply to other embodiments of the invention such as the embodiment illustrated in FIG. 6), the eyelets 90 and 92 of the fork element 54 and the eyelet 78 of the engaging member 74 are each provided with an enlarged portion 115, for example in correspondence of the central part thereof, and the roller 96 adapted to slide within said eyelets 78, 90 and 92 is provided at one end with a first head 120 having a diameter greater than the maximum width of the eyelets 78, 90, 92 (that is greater than the width of enlarged portions 115), and at the other end with a second head 130 having a diameter corresponding to the width of the enlarged portions 115 of the slots 78, 90, 92. In accordance with this embodiment of the invention, the roller 96 can be concurrently introduced in all three overlapped eyelets 78, 90, 92 only when the enlarged portions 115 of all three eyelets are perfectly aligned to each other, by inserting the roller 96 within the enlarged portions 115 of the eyelets 78, 90, 92 from the part of the second head 130. Once inserted, the roller 96 is capable of sliding by rolling within the three eyelets 78, 90, 92 without slipping out from the latter thanks to the presence of the heads 120, 130, since the head 120 has a diameter greater than the maximum width of all three eyelets 78, 90, 92, and the head 130, having a diameter corresponding to the width of the enlarged portions 115, may slip off from the eyelets only when the roller 96 and the enlarged portions 115 of all three eyelets are perfectly aligned with each other—wherein said latter case is obtainable only through the use of appropriate positioning tools.

Naturally, to the solution described above one skilled in the art, in order to satisfy contingent and specific needs, may make numerous modifications and variations. In particular, although the present invention has been described with a certain level of detail with reference to its preferred embodiments, it is clear that various omissions, substitutions and changes in the form and details as well as other embodiments are possible: Furthermore, it is expressly intended that specific elements and/or method steps described in connection with any embodiment of the invention shown can be incorporated in any other embodiment as a normal design choice.

For example, although in the present description reference has been made to pins and rollers of metal, nothing forbids to consider other materials in those applications where the stresses on the pins are not so high as to require the use of metallic materials. For example, the concepts of the present invention may be applied to the cases in which the pins and/or rollers are made of thermoplastic resins reinforced with synthetic fibers (for example Kevlar®) or mineral (e.g., glass fiber).

The invention claimed is:

1. A transport chain for transporting articles, said chain comprising:
    a sequence of links, each link defining a substantially flat support surface for the articles to be transported, and wherein each link is hingedly coupled with a previous link in the sequence, each link comprising a respective first link element defining a first portion of the support surface of the link and a respective second link element defining a second portion of the support surface of the link, said first link element and said second link element being hingedly coupled with each other through mechanical coupling allowing the first link element to rotate with respect to the second link element, and vice versa, about a rotation axis perpendicular to the support surface of the link, wherein said mechanical coupling is spaced from the rotation axis, said mechanical coupling including a pivot at one of said first link element and said second link element, and an eyelet at the other of said first link element and said second link element, said pivot including a roller slidingly housed in said eyelet, said roller moving within said eyelet by rolling against a wall of said eyelet.

2. The transport chain of claim 1, wherein said mechanical coupling between the first link element and the second link element of a link is configured in such a way that said rotation axis does not intersect said link.

3. The transport chain of claim 1, wherein the pivot is at the first link element and the eyelet is at the second link element.

4. The transport chain of claim 1, wherein said pivot is arranged with an axis extending along a direction perpendicular to the first portion of the support surface of the link, and said eyelet extending along a plane parallel to the second portion of the support surface of the link by describing a circumference arc having a center, said rotation axis passing by said center.

5. The transport chain of claim 1, wherein said mechanical coupling includes a pin at one of the first link element and the second link element, and an engaging member at the other of the first link element and the second link element, the engaging member including a slot, pin being slidingly engaged in the slot of the engaging member.

6. The transport chain of claim 1, wherein said eyelet is a first eyelet, and the mechanical coupling includes the first eyelet, a second eyelet, and a third eyelet, said first eyelet at the second link element, and the second eyelet and the third eyelet being at the first link element, said first eyelet being arranged between said second eyelet and said third eyelet in such a way to at least partially overlap therewith; a roller slidingly housed in the first eyelet, in the second eyelet and in the third eyelet, said roller being free of slidingly moving within the first eyelet, the second eyelet and the third eyelet by rolling against the walls of said first eyelet, and walls of the second eyelet, and third eyelet.

7. The transport chain of claim 6, wherein said roller is arranged with an axis extending along a direction perpendicular to the first portion of the support surface of the link and to the second portion of the support surface of the link; said first eyelet extends along a respective plane parallel to the second portion of the support surface of the link describing a first circumference arc having a first center, said rotation axis passing by said first center; said second eyelet and third eyelet extends along a respective plane parallel to the first portion of the support surface of the link describing a second circumference arc having a second center and a third circumference arc having a third center, respectively, said rotation axis passing by said second center and third center.

8. The transport chain of claim 7, wherein said first link element includes a fork element comprising a first arm and a second arm, said second eyelet being located on said first arm and said third eyelet being located on said second arm; said second link element includes an engaging member comprising said first eyelet, said engaging member being arranged for being inserted between the two arms of the fork element.

9. The transport chain of claim 1, wherein each link is hingedly coupled with a previous link in the sequence through a pivot having an axis parallel to the support surface of said link.

10. A transport chain for transporting articles, said chain comprising:
a sequence of links, each link defining a substantially flat support surface for the articles to be transported, and wherein each link is hingedly coupled with a previous link in the sequence, each link comprising a respective first link element defining a first portion of the support surface of the link and a respective second link element defining a second portion of the support surface of the link, said first link element and said second link element being hingedly coupled with each other through mechanical coupling allowing the first link element to rotate with respect to the second link element, and vice versa, about a rotation axis perpendicular to the support surface of the link, said mechanical coupling being spaced from the rotation axis, wherein said pivot is arranged with an axis that extends along a direction which is perpendicular to the first portion of the support surface of the link, and said eyelet extends along a plane parallel to the second portion of the support surface of the link by describing a circumference arc having a center, said rotation axis passing by said center, said mechanical coupling including a pivot at one of said first link element and said second link element, and an eyelet at the other of said first link element and said second link element, said pivot being arranged with an axis extending along a direction perpendicular to the first portion of the support surface of the link, and said eyelet extending along a plane parallel to the second portion of the support surface of the link by describing a circumference arc having a center, said rotation axis passing by said center, wherein said first link element includes a fork element, said pivot being supported between two arms of the fork element; and said second link element includes an engaging member including said eyelet, said engaging member being arranged for being inserted between the two arms of the fork element.

11. The transport chain of claim 10, wherein said pivot is integrally fastened to the fork element.

12. A transport chain for transporting articles, said chain comprising:
a sequence of links, each link defining a substantially flat support surface for the articles to be transported, and wherein each link is hingedly coupled with a previous link in the sequence, each link including a respective first link element defining a first portion of the support surface of the link and a respective second link element defining a second portion of the support surface of the link, said first link element and said second link element being hingedly coupled with each other through mechanical coupling allowing the first link element to rotate with respect to the second link element, and vice versa, about a rotation axis perpendicular to the support surface of the link, said mechanical coupling is spaced from the rotation axis, wherein said first link element includes a first plate-shaped portion exhibiting on the upper part said first portion of the support surface of the link, and said second link element includes a second plate-shaped portion exhibiting on the upper part said second portion of the support surface of the link; said second plate-shaped portion has the shape of a segment of a circle having a center belonging to the rotation axis and having a first radius; said first plate-shaped portion includes an arched seat having the shape of a segment of a circle having a center belonging to the rotation axis and having a second radius corresponding to the first radius; said second link element is received in the arched seat of the first plate-shaped portion of the first link element.

13. A link for use in a transport chain according to claim 1, said link comprising:
a support surface for supporting articles to be transported;
a first link element defining a first portion of the support surface;
a second link element defining a second portion of the support surface; and
a mechanical coupling hingedly coupling said first link element and said second link element and allowing the first link element to rotate with respect to the second link element, and vice versa, about a rotation axis perpendicular to the support surface of the link, wherein said mechanical coupling is spaced from the rotation axis, said mechanical coupling including a pivot at one of said first link element and said second link element, and an eyelet at the other of said first link element and said second link element, said pivot including a roller slidingly housed in said eyelet, said roller moving within said eyelet by rolling against walls of said eyelet.

* * * * *